United States Patent
Sato et al.

(10) Patent No.: US 10,969,895 B2
(45) Date of Patent: Apr. 6, 2021

(54) INPUT DEVICE

(71) Applicant: ALPS ALPINE CO., LTD., Tokyo (JP)

(72) Inventors: Wataru Sato, Miyagi (JP); Daisuke Takai, Miyagi (JP); Hiroshi Shigetaka, Miyagi (JP); Yuzuru Kawana, Miyagi (JP); Hajime Shikata, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/839,245

(22) Filed: Apr. 3, 2020

(65) Prior Publication Data

US 2020/0233557 A1 Jul. 23, 2020

Related U.S. Application Data

(63) Continuation of application No. PCT/JP2018/036180, filed on Sep. 28, 2018.

(30) Foreign Application Priority Data

Oct. 13, 2017 (JP) .............................. JP2017-199861

(51) Int. Cl.
*G06F 3/041* (2006.01)
*G01L 1/18* (2006.01)
(Continued)

(52) U.S. Cl.
CPC ............ *G06F 3/04142* (2019.05); *G01L 1/16* (2013.01); *G01L 1/18* (2013.01); *G01L 1/20* (2013.01); *G06F 2203/04105* (2013.01)

(58) Field of Classification Search
None
See application file for complete search history.

(56) References Cited

U.S. PATENT DOCUMENTS 8,875,584 B2* 11/2014 Sasajima ................. G01L 1/005
73/774
2013/0063383 A1* 3/2013 Anderssonreimer ......................
G06F 3/0202
345/173

(Continued)

FOREIGN PATENT DOCUMENTS

JP H01-253622 10/1989
JP 2005-332063 12/2005
(Continued)

OTHER PUBLICATIONS

International Search Report for PCT/JP2018/036180 dated Nov. 6, 2018.

*Primary Examiner* — Brian M Butcher
(74) *Attorney, Agent, or Firm* — IPUSA, PLLC

(57) ABSTRACT

An input device includes an operation panel, a frame disposed on a back side of the operation panel, a pressure detector disposed between the operation panel and the frame, and an elastic part. The pressure detector includes a lever including a deformation part that warps when a pressing force is applied, a protruding part provided on a first surface of the deformation part, and a surrounding wall provided on a periphery of a second surface of the deformation part; and a pressure detection element that is disposed in a region of the second surface of the deformation part surrounded by the surrounding wall, warps along with the deformation part, and outputs a pressure detection signal corresponding to the pressing force. The elastic part is disposed between the protruding part or the surrounding wall and the frame or the operation panel and applies a pre-pressure to the deformation part.

11 Claims, 7 Drawing Sheets

(51) Int. Cl.
 *G01L 1/20* (2006.01)
 *G01L 1/16* (2006.01)

(56) References Cited

U.S. PATENT DOCUMENTS

| | | | |
|---|---|---|---|
| 2015/0138112 A1* | 5/2015 | Campbell | G01L 1/142 |
| | | | 345/173 |
| 2017/0010718 A1* | 1/2017 | Matsui | G06F 3/044 |
| 2017/0220143 A1* | 8/2017 | Sah | G06F 3/04142 |
| 2017/0220195 A1* | 8/2017 | Sah | G06F 3/04883 |
| 2017/0234609 A1* | 8/2017 | Park | G06F 3/0416 |
| | | | 345/174 |

FOREIGN PATENT DOCUMENTS

| | | |
|---|---|---|
| JP | 2010-238176 | 10/2010 |
| JP | 2014-013158 | 1/2014 |
| JP | 2014-206924 | 10/2014 |

\* cited by examiner

INPUT DEVICE

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2018/036180, filed on Sep. 28, 2018, which is based on and claims priority to Japanese Patent Application No. 2017-199861 filed on Oct. 13, 2017, the entire contents of which are incorporated herein by reference.

BACKGROUND OF THE INVENTION

1. Field of the Invention

An aspect of this disclosure relates to an input device.

2. Description of the Related Art

An input device including a touch panel or a touch pad is used in various types of electronic devices (for example, a smartphone, a mobile phone, a tablet terminal, a notebook computer, and a game machine) and vehicles such as automobiles. Also, such an input device uses a technology for generating vibration on an operation surface of the touch panel or the touch pad in response to a pressing operation on the operation surface and thereby providing tactile feedback on the pressing operation to a user's finger.

For example, Japanese Unexamined Patent Application Publication No. 2005-332063 discloses an input device including a tactile function. In the input device, when a pressing operation is performed by an operating body on an input detection surface of a display screen, force detectors provided at four corners of an input unit (touch panel) detect a pressing force applied by the pressing operation and cause an actuator to vibrate the input detection surface with a vibration pattern (frequency and amplitude) corresponding to the pressing force to provide a tactile sensation in response to the pressing operation.

However, with the technology disclosed in Japanese Unexamined Patent Application Publication No. 2005-332063, the input detection surface may be distorted by a pressing operation. For example, with the technology disclosed in Japanese Unexamined Patent Application Publication No. 2005-332063, the input detection surface becomes more likely to be distorted as the distance between a pressed position on the input detection surface and the force detectors increases. With the technology disclosed in Japanese Unexamined Patent Application Publication No. 2005-332063, a certain level of pressing force is necessary to overcome the resistance of the four force detectors. This makes the input detection surface more likely to be distorted. If the input detection surface is distorted, the pressing force is reduced by the distortion, and the pressing force detected by the force detectors becomes lower than the actual pressing force.

Also, with the technology disclosed in Japanese Unexamined Patent Application Publication No. 2005-332063, because a pressing force applied to the input detection surface is distributed to the four force detectors, the detected pressing force may vary due to variation in accuracy among the four force detectors. For the above reasons, there are cases where a pressing force applied to the input detection surface cannot be accurately detected with the technology disclosed in Japanese Unexamined Patent Application Publication No. 2005-332063.

Further, with the technology disclosed in Japanese Unexamined Patent Application Publication No. 2005-332063, it is necessary to provide four force detectors in an input device. This in turn may complicate the configuration and the control of the input device and increase the costs of the input device.

Accordingly, there is a demand for an input device that has a relatively simple configuration and can accurately detect a pressing force applied to an operation panel regardless of a pressed position on the operation panel.

SUMMARY OF THE INVENTION

In an aspect of this disclosure, there is provided an input device that includes an operation panel including an operation surface, a frame disposed on a back side of the operation panel, a pressure detector that is disposed between the operation panel and the frame to detect a pressing force applied to the operation surface, and an elastic part. The pressure detector includes a lever including a deformation part that warps when the pressing force is applied, a protruding part that is provided on a first surface of the deformation part and protrudes toward the frame or the operation panel, and a surrounding wall provided on a periphery of a second surface of the deformation part, the deformation part being configured to warp when the pressing force is applied via the protruding part to the deformation part; and a pressure detection element that is disposed in a region of the second surface of the deformation part surrounded by the surrounding wall, warps along with the deformation part, and outputs a pressure detection signal corresponding to the pressing force. The elastic part is disposed between the protruding part or the surrounding wall and the frame or the operation panel and applies a pre-pressure to the deformation part.

DESCRIPTION OF THE PREFERRED EMBODIMENTS

Embodiments of the present invention are described below with reference to the accompanying drawings.

(Configuration of Input Device)

Figure 1:
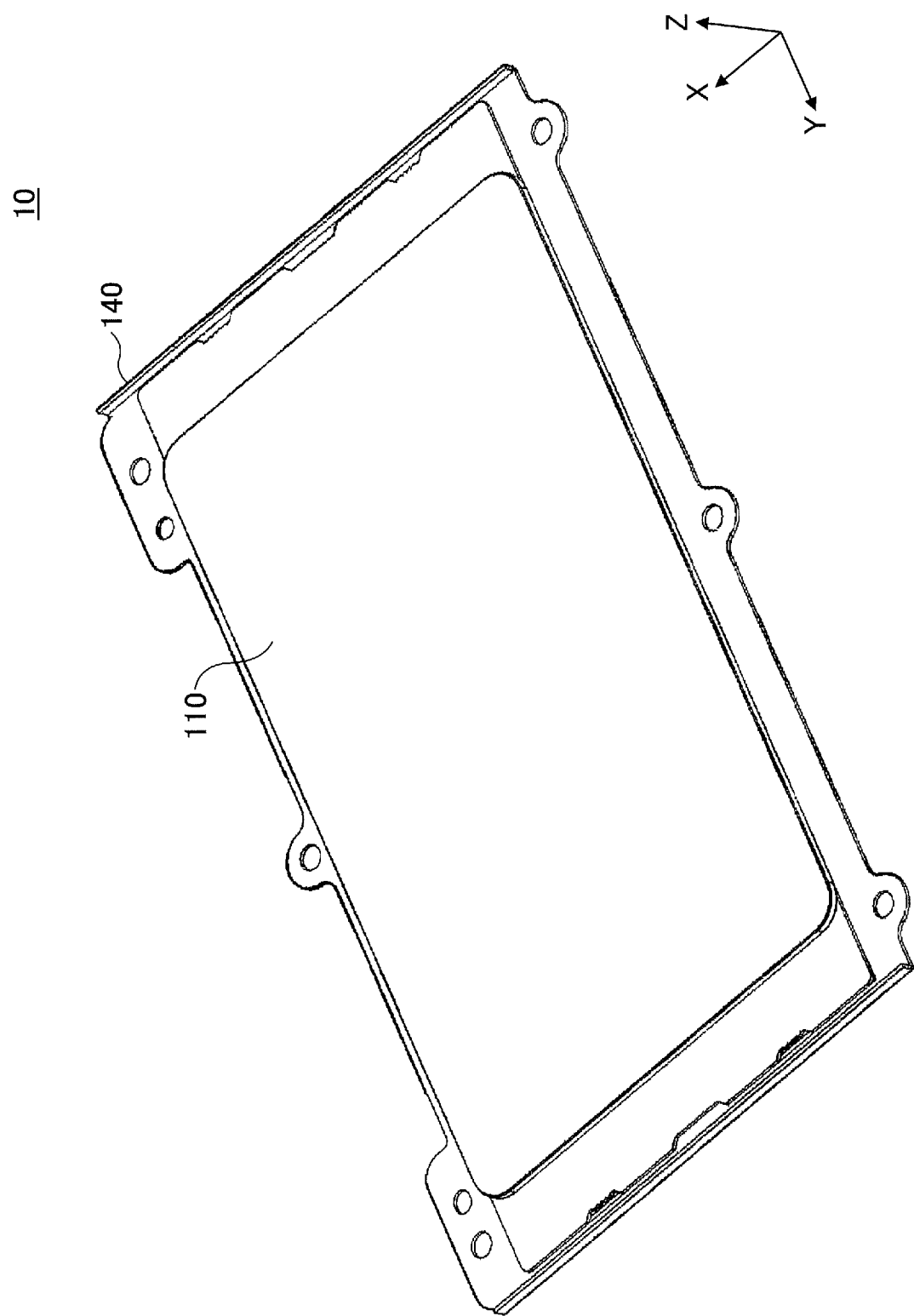
FIG. 1 is a perspective view of an input device according to an embodiment.
Figure 2:
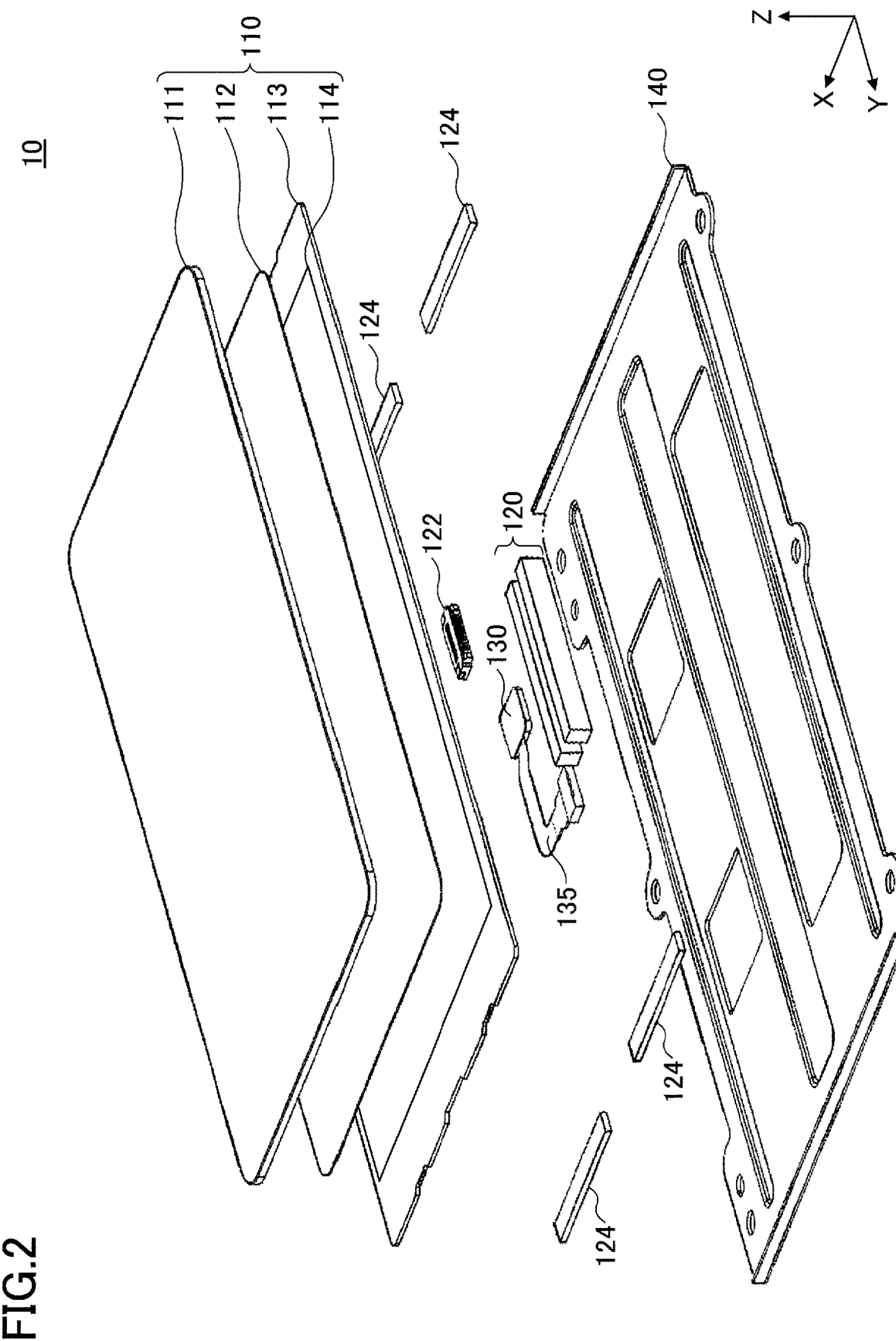
FIG. 2 is an exploded perspective view of the input device according to the embodiment.

FIG. 1 is a perspective view of an input device 10 according to an embodiment. FIG. 2 is an exploded perspective view of the input device 10. In the descriptions below, a Z-axis direction (the thickness direction of the input device 10) in the drawings is referred to as a vertical direction, an X-axis direction (the width direction of the input device 10) in the drawings is referred to as a lateral direction, and a Y-axis direction (the longitudinal direction of the input device 10) in the drawings is referred to as a longitudinal direction.

The input device 10 illustrated in FIGS. 1 and 2 is a so-called "touch pad", and may be used as a component of various types of target devices (e.g., a smartphone, a mobile phone, a tablet terminal, a digital video camera, a notebook computer, a game machine, and an in-vehicle system). The input device 10 includes an operation panel 110 and can receive an input via a touch operation (e.g., a moving operation or a pressing operation) performed by a user's finger on an operation surface of the operation panel 110.

The input device 10 also includes actuators 120. The actuators 120 cause the operation surface of the operation panel 110 to vibrate in response to a touch operation (pressing operation) performed by a user, and thereby provide tactile feedback on the touch operation to the user's finger.

As illustrated in FIG. 2, the input device 10 has a multilayer structure where cover glass 111, an adhesive sheet 112, a printed board 113, and a metal frame 140 are stacked in this order from the operation surface side (+Z side).

The cover glass 111, the adhesive sheet 112, and the printed board 113 constitute the operation panel 110 described above. Each of the cover glass 111, the adhesive sheet 112, and the printed board 113 has a horizontally-long, substantially-rectangular shape in plan view. In the present embodiment, a projected capacitive touch panel is used as an example of the operation panel 110. However, the present invention is not limited to this example, and the operation panel 110 may be implemented by any other type of touch panel (e.g., a surface capacitive touch panel, a resistive touch panel, an infrared touch panel, or an ultrasonic surface acoustic wave touch panel).

The cover glass 111 is a thin plate-shaped part formed of a relatively hard and transparent material. The cover glass 111 is provided at the forefront of the operation panel 110 mainly to protect the upper (+Z side) surface of the printed board 113. That is, the upper (+Z side) surface of the cover glass 111 serves as the operation surface of the operation panel 110. The cover glass 111 may be implemented by, for example, a glass plate or a resin plate.

The adhesive sheet 112 is a thin sheet formed of a transparent and adhesive material. The adhesive sheet 112 is disposed between the cover glass 111 and the printed board 113 to bond the cover glass 111 and the printed board 113 to each other.

The printed board 113 is a thin-plate part formed of a relatively hard material. An electrostatic sensor 114 is provided on the upper (+Z side) surface of the printed board 113. The electrostatic sensor 114 detects a contact position of a user's finger on the operation surface of the operation panel 110, and outputs a position detection signal indicating the contact position. Specifically, the electrostatic sensor 114 detects the capacitance at each coordinate position on the operation surface of the operation panel 110, and outputs information indicating the capacitance at each coordinate position as a position detection signal. The electrostatic sensor 114 is comprised of thin-film electrode patterns (an electrode pattern in the X-axis direction and an electrode pattern in the Y-axis direction) formed on the upper (+Z side) surface of the printed board 113. Each electrode pattern may be formed of, for example, indium tin oxide (ITO) or a metal film (e.g., a composite material of silver, copper, aluminum, and molybdenum).

Actuators 120 and a control circuit 122 are provided on the lower (−Z side) surface of the printed board 113.

The actuators 120 cause the operation surface of the operation panel 110 to vibrate. Specifically, the actuators 120 are driven by the control circuit 122 and vibrate, and transfer the vibration to the operation surface of the operation panel 110 to cause the operation surface of the operation panel 110 to vibrate. Each of the actuators 120 may be implemented by, for example, an electrostatic actuator, a piezoelectric actuator, or an electromagnetic actuator. Although the input device 10 of the present embodiment includes two actuators 120, the number of the actuators 120 is not limited to two. For example, the input device 10 may include one actuator 120 or three or more actuators 120.

The control circuit 122 controls input and output of various signals (for example, a position detection signal, a pressure detection signal, and a vibration control signal) between the input device 10 and an external device. The control circuit 122 also controls vibration of the actuators 120. For example, when a force sensor unit 130 detects a pressing force applied to the operation surface of the operation panel 110, the control circuit 122 outputs a drive signal to the actuators 120 to cause the actuators 120 to vibrate. With this configuration, the user can feel, at a fingertip, feedback on a pressing operation performed on the operation panel 110. The control circuit 122 may also control the vibration of the actuators 120 based on a vibration control signal input from an external device. The control circuit 122 may be implemented by, for example, an integrated circuit (IC).

The metal frame 140 is provided on the back side (−Z side) of the operation panel 110, and is a plate-shaped part formed by processing a thin metal plate. The metal frame 140 has a horizontally-long, substantially-rectangular shape in plan view. The metal frame 140 securely supports the printed board 113 of the operation panel 110 that is stacked on the upper (+Z side) surface of the metal frame 140. The input device 10 is fixed to a target electronic device via the metal frame 140 using fixing parts such as screws.

Cushioning parts 124 and the force sensor unit 130 are provided between the printed board 113, which is the lowermost layer of the operation panel 110, and the metal frame 140.

The cushioning parts 124 are disposed between the printed board 113 and the metal frame 140 and bonded to both of the printed board 113 and the metal frame 140. The cushioning parts 124 expand and contract in the vertical direction in response to a load applied by the operation panel 110 and thereby enable the operation panel 110 to move in the vertical direction. For example, when the operation panel 110 is pressed, the cushioning parts 124 contract in the vertical direction and the operation panel 110 moves downward. Then, when the pressing force applied to the operation panel 110 is removed, the cushioning parts 124 expand in the vertical direction due to the elastic force, and the operation panel 110 moves upward and returns to the original position. In the example illustrated in FIG. 2, two cushioning parts 124 are arranged along each of the right and left edges of the input device 10. In the example illustrated in FIG. 2, the cushioning parts 124 are implemented by elastic sheets formed of an elastic material such as rubber, resin, or silicon. However, the cushioning parts 124 are not limited to elastic sheets and may be implemented by, for example, various types of springs. The material, the shape, the arrangement, and the number of the cushioning parts 124 are not limited to those illustrated in FIG. 2.

The force sensor unit 130 is an example of a "pressure detector". The force sensor unit 130 detects a pressing force applied to the operation surface of the operation panel 110, and outputs a pressure detection signal indicating a voltage value corresponding to the pressing force. The pressure detection signal output from the force sensor unit 130 is input to the control circuit 122 via a flexible printed circuit (FPC) 135 and wiring formed on the printed board 113. The force sensor unit 130 is disposed substantially in the center of a region surrounded by multiple cushioning parts 124 in the horizontal direction (the X-axis direction and the Y-axis direction) of the input device 10. However, the force sensor unit 130 may be disposed in any other position. Still, however, the force sensor unit 130 is preferably disposed at least in a region that is surrounded by multiple cushioning parts 124. For example, if the force sensor unit 130 is disposed outside of the region surrounded by the cushioning parts 124, a pressing force applied to the operation panel 110 may be influenced by the resistance of the cushioning parts 124 and may change before being transferred to the force sensor unit 130. Accordingly, disposing the force sensor unit 130 in a region surrounded by the cushioning parts 124 makes it possible to prevent the pressing force from being changed and to more accurately detect the pressing force applied to the operation panel 110.

The specifications of components of the input device 10 of the present embodiment are described below. Although the input device 10 has a small thickness (approximately 3.6 mm) as a whole, because the cover glass 111 is formed of a relatively hard material and has an appropriate thickness, the operation panel 110 has high rigidity and is less likely to be deformed by a pressing operation.

<Cover Glass 111>
  Material: Glass
  Thickness: 1.1 mm
<Adhesive Sheet 112>
  Material (Base Material): Polyethylene terephthalate (PET)
  Material (adhesive): acrylic
  Thickness: 0.2 mm
<Printed Board 113 (Including Electrostatic Sensor 114)>
  Material: flame retardant type 4 (FR-4)
  Thickness: 0.5 mm
<Force Sensor Unit 130>
  Material (lever 131): polyphenylether (PPE)
  Material (pressure detection element 132): carbon
  Material (FPC 135): Polyimide
  Thickness (entire lever 131): 1.0 mm
<Cushioning Part 124>
  Material: silicon rubber
  Thickness: 0.8 mm
<Elastic Part 150>
  Material: silicon rubber
  Thickness: 0.4 mm
<Metal Frame 140>
  Material: SUS304 or SUS430
  Thickness: 0.5 mm
(Configuration of Force Sensor Unit)

Figure 3A:
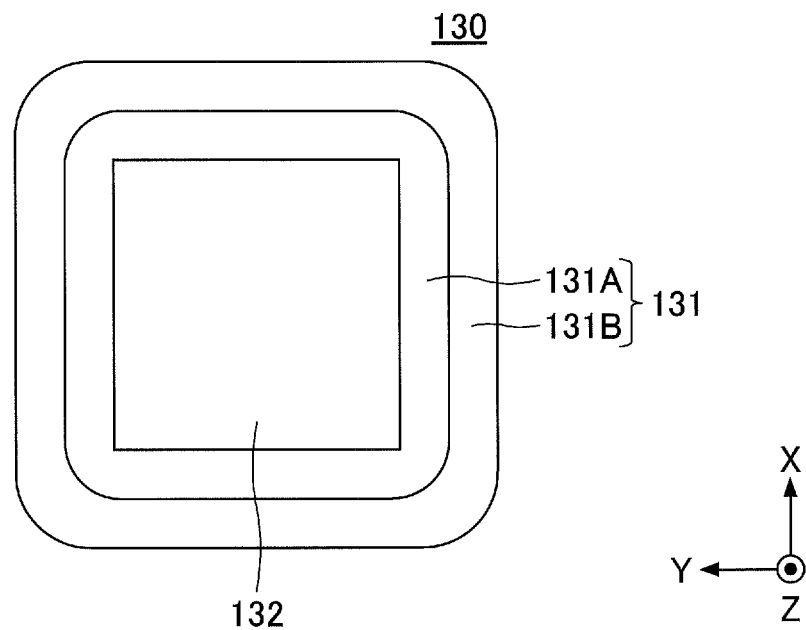
FIG. 3A is a plan view of a force sensor unit.
Figure 3B:
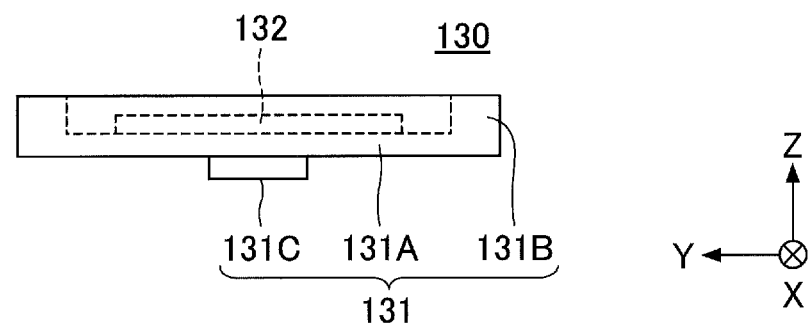
FIG. 3B is a front view of the force sensor unit.
Figure 3C:
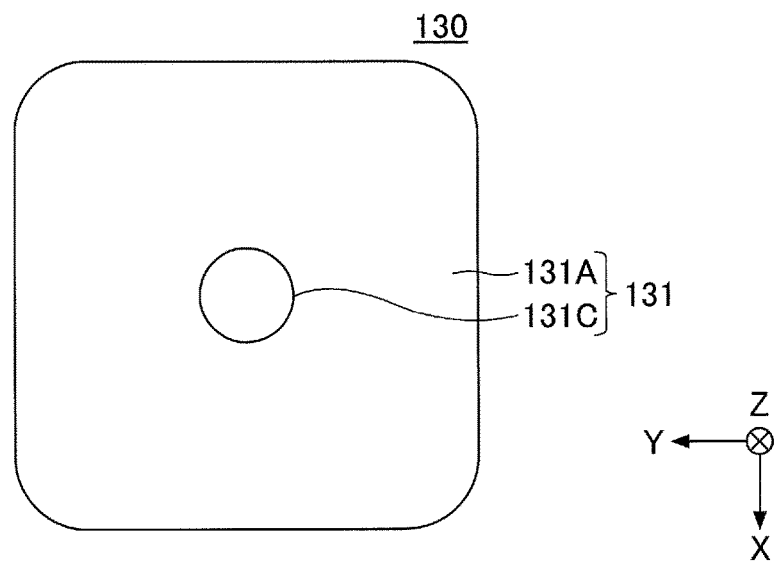
FIG. 3C is a bottom view of the force sensor unit.

FIGS. 3A through 3C are drawings illustrating a configuration of the force sensor unit 130 of the input device 10 of the present embodiment. FIG. 3A is a plan view of the force sensor unit 130. FIG. 3B is a front view of the force sensor unit 130. FIG. 3C is a bottom view of the force sensor unit 130.

As illustrated in FIGS. 3A through 3C, the force sensor unit 130 includes a lever 131 and a pressure detection element 132.

The lever 131 is formed of a resin material. The lever 131 includes a deformation part 131A, a surrounding wall 131B, and a protruding part 131C.

The deformation part 131A is shaped like a horizontal, thin flat plate. The deformation part 131A can warp or deform into a curved shape when a pressing force applied to the operation panel 110 is transferred via the protruding part 131C to the deformation part 131A. The rigidity of the deformation part 131A is designed to be lower than the rigidity of the operation panel 110 against the pressing force applied to the operation surface of the operation panel 110. For example, in the present embodiment, the deformation part 131A is formed of a material (resin) that is softer than the cover glass 111 and has a thickness less than the thickness of the cover glass 111. With this configuration of the input device 10 of the present embodiment, regardless of a pressed position on the operation panel 110, the deformation part 131A and the pressure detection element 132 warp before the operation panel 110 deforms, and the pressing force can be detected based on the warping. This configuration makes it possible to prevent a pressing force applied to the operation surface of the operation panel 110 from being reduced due to the deformation of the operation panel 110 and thereby makes it possible to more accurately detect the pressing force.

The surrounding wall 131B protrudes upward toward the printed board 113 from the periphery of the upper (+Z side) surface of the deformation part 131A. The surrounding wall 131B distances the deformation part 131A from the printed board 113 and supports the periphery of the deformation part 131A together with the printed board 113. With this configuration, the surrounding wall 131B supports the deformation part 131A such that the deformation part 131A (a portion surrounded by the surrounding wall 131B) can warp, enables the pressure detection element 132 to be placed between the deformation part 131A and the printed board 113, and forms a space that allows deformation of the deformation part 131A and the pressure detection element 132. The upper (+Z side) surface of the surrounding wall 131B is bonded to the lower (−Z side) surface of the printed board 113. The surrounding wall 131B is designed to have a rigidity higher than the rigidity of the deformation part 131A against the pressing force applied to the operation surface of the operation panel 110. This configuration of the force sensor unit 130 enables the deformation part 131A (a portion surrounded by the surrounding wall 131B) to warp when the deformation part 131A is pressed by the protruding part 131C while preventing deformation of the surrounding wall 131B. In the example illustrated in FIGS. 3A through 3C, the surrounding wall 131B is formed continuously along the periphery of the upper surface of the deformation part 131A. However, the present invention is not limited to this example, and the surrounding wall 131B may formed intermittently along the periphery of the upper surface of the deformation part 131A.

The protruding part 131C protrudes downward from the central portion of the lower (−Z side) surface of the deformation part 131A toward the metal frame 140. When a pressing force applied to the operation panel 110 is transferred from the metal frame 140, the protruding part 131C transfers the pressing force to the deformation part 131A and causes the deformation part 131A to warp. In the example illustrated in FIGS. 3A through 3C, the protruding part 131C has a cylindrical shape. However, the protruding part 131C may have any other shape. For example, the end face area of the protruding part 131C may be reduced or the end face of the protruding part 131C may be shaped into a curved surface so that the contact of the protruding part 131C becomes closer to a point contact. With this configuration, even if a force is applied obliquely to the protruding part 131C due to the pressed position or the pressed direction of the operation surface, its influence can be suppressed and the variation in detection accuracy can be reduced. Also, in the example illustrated in FIGS. 3A through 3C, the protruding part 131C and the deformation part 131A are formed as a monolithic component. However, the present invention is not limited to this example, and the protruding part 131C and the deformation part 131A may be formed as separate components.

The pressure detection element 132 is provided on the upper (+Z side) surface of the deformation part 131A of the lever 131 in a region surrounded by the surrounding wall 131B. The pressure detection element 132 is bonded to the upper (+Z side) surface of the deformation part 131A. With this configuration, when a pressing force is applied to the deformation part 131A and the deformation part 131A warps, the pressure detection element 132 also warps. The resistance of the pressure detection element 132 varies depending on the amount of warp. For example, with the configuration illustrated in FIGS. 3A through 3C, the pressure detection element 132 warps in a stretching direction, and the resistance of the pressure detection element 132 increases as the amount of warp increases. The pressure detection element 132 outputs a voltage signal indicating a voltage value corresponding to the resistance as a pressure detection signal indicating a pressing force applied to the operation surface of the operation panel 110. In the present embodiment, the pressure detection element 132 is implemented by a resistive strain sensor. Conductive particles are dispersed in a binder in the resistive strain sensor, and the resistance of the resistive strain sensor changes when the distance between the conductive particles changes as a result of expansion and contraction caused by warp. The pressure detection element 132 is not limited to a resistive strain sensor, and may be implemented by, for example, a piezoelectric sensor or a piezoresistive sensor.

(Operation of Force Unit)

Figure 4A:
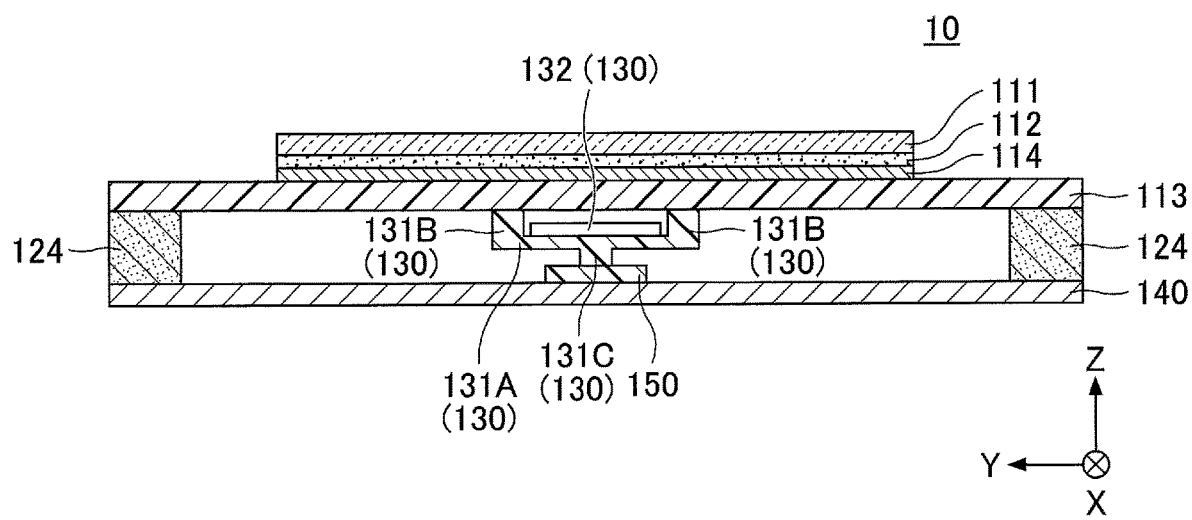
FIG. 4A is a drawing illustrating a state of the force sensor unit where no pressing force is being applied to an operation surface of an operation panel.
Figure 4B:
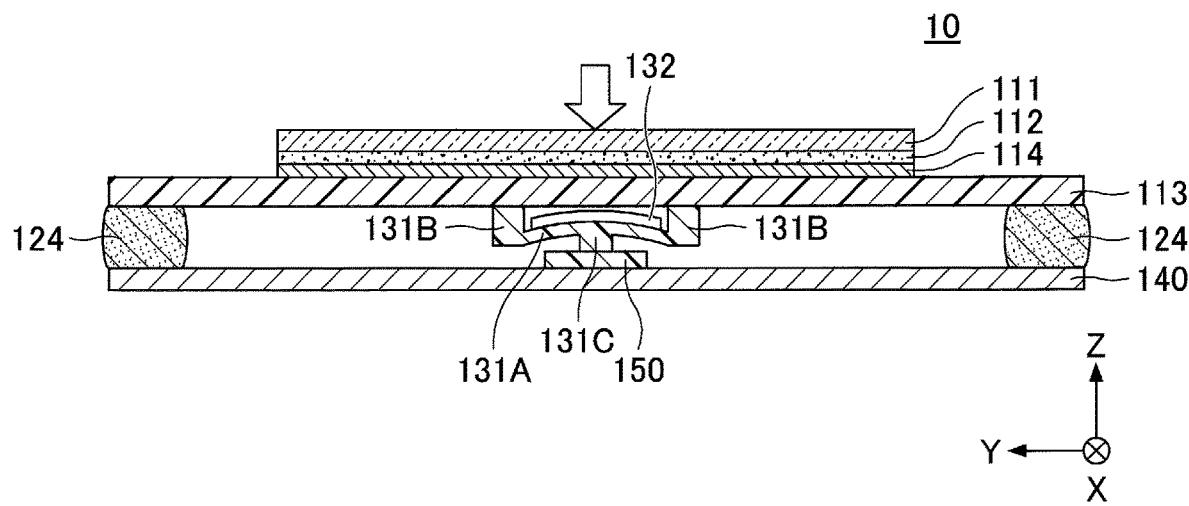
FIG. 4B illustrates a state of the force sensor unit where a pressing force is being applied to the operation surface of the operation panel.

FIGS. 4A and 4B are drawings illustrating operation of the force sensor unit 130 of the input device 10 according to the present embodiment. FIG. 4A illustrates a state of the force sensor unit 130 where no pressing force is being applied to the operation surface of the operation panel 110. FIG. 4B illustrates a state of the force sensor unit 130 where a pressing force is being applied to the operation surface of the operation panel 110.

As illustrated in FIGS. 4A and 4B, the force sensor unit 130 is disposed between the printed board 113 and the metal frame 140 such that the protruding part 131C faces downward (−Z direction). An elastic part 150 is disposed between the protruding part 131C of the force sensor unit 130 and the metal frame 140. In the example illustrated in FIGS. 4A and 4B, the elastic part 150 is implemented by a sheet-shaped part formed of an elastic material (e.g., rubber, resin, or silicon). In a state where the elastic part 150 is sandwiched between the end face of the protruding part 131C and the metal frame 140, the elastic force of the elastic part 150 applies a pre-pressure to the protruding part 131C and the deformation part 131A at such a level that the deformation part 131A do not warp. With this configuration, the force sensor unit 130 can detect even a very small pressing force applied to the operation panel 110. Due to its elasticity, the elastic part 150 can absorb vibration between the operation panel 110 and the metal frame 140. Accordingly, the elastic part 150 can prevent a false detection by the pressure detection element 132 caused by, for example, a vibration or an impact applied to the metal frame 140. Also, the elastic part 150 can prevent the vibration generated by the actuators 120 from escaping into the metal frame 140 and thereby prevent the vibration force of the actuators 120 from being reduced.

As illustrated in FIG. 4B, when a downward pressing operation is performed on the operation panel 110 and the entire operation panel 110 moves downward, the protruding part 131C of the force sensor unit 130 is pushed upward by the metal frame 140. As a result, the protruding part 131C presses the deformation part 131A of the lever 131 upward. The lever 131 is configured such that the rigidity of the deformation part 131A is relatively low and the rigidity of the surrounding wall 131B around the deformation part 131A is relatively high. With this configuration of the lever 131, while the surrounding wall 131B does not deform, the deformation part 131A pressed by the protruding part 131C warps upward. As a result, the pressure detection element 132 provided on the upper (+Z side) surface of the deformation part 131A warps and outputs a voltage signal indicating a voltage value corresponding to the warp as a pressure detection signal indicating a pressing force applied to the operation surface of the operation panel 110.

Thus, the input device 10 of the present embodiment is configured such that a pressing force applied to the operation panel 110 is concentrated on one point, i.e., the protruding part 131C of the lever 131, to cause the pressure detection element 132 to warp along with the deformation part 131A of the lever 131 and detect a pressing force applied to the operation panel 110. With this configuration of the input device 10 of the present embodiment, regardless of a position on the operation panel 110 to which a pressing force is applied, the deformation part 131A can be uniformly warped by the pressing force, and the pressing force can be reliably transferred to the pressure detection element 132. Accordingly, the input device 10 of the present embodiment can suppress variation in detection accuracy depending on the pressed position on the operation panel 110 with a relatively simple configuration, and can accurately detect the pressing force applied to the operation panel 110.

Particularly, the input device 10 of the present embodiment is configured such that the rigidity of the deformation part 131A against the pressing force applied to the operation surface of the operation panel 110 is lower than the rigidity of the operation panel 110. With this configuration of the input device 10 of the present embodiment, when the operation panel 110 is pressed, the deformation part 131A warps before the operation panel 110 warps, and a pressing force can be detected based on the warp. Thus, the input device 10 of the present embodiment can prevent a pressing force applied to the operation surface of the operation panel 110 from being reduced due to the deformation of the operation panel 110 and can more accurately detect the pressing force applied to the operation panel 110.

Also, with the configuration of the input device 10 of the present embodiment, even when the operation panel 110 is tilted as a result of being pressed, the deformation part 131A can be uniformly warped via the protruding part 131C, and the pressing force can be detected based on the warp. Thus, the configuration of the input device 10 of the present embodiment makes it possible to suppress variation in detection accuracy due to the tilt of the operation panel 110 and to accurately detect a pressing force applied to the operation panel 110.

Also, with the configuration of the input device 10 of the present embodiment, because the pressure detection element 132 needs to be provided only in one place (the lever 131), the process of mounting the pressure detection element 132 during the assembly of the input device 10 can be simplified.

Also, with the configuration of the input device 10 of the present embodiment, the pressing force applied to the operation surface of the operation panel 110 can be detected with one pressure detection element 132. This, for example, makes it possible to reduce the component costs of the input device 10. Further, with the configuration of the input device 10 of the present embodiment, variation in the detected pressing force resulting from the variation in accuracy among multiple pressure detection elements does not occur, and therefore a pressing force applied to the operation panel 110 can be accurately detected.

Variations

Next, variations of the input device 10 of the present embodiment are described with reference to FIGS. 5 through 8.

First Variation

Figure 5:
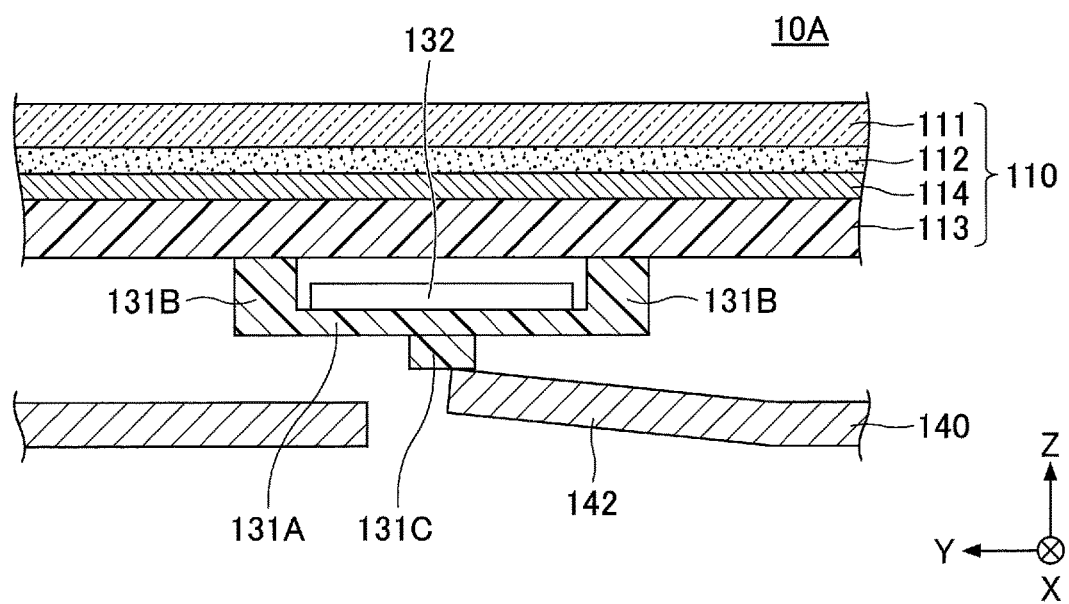
FIG. 5 is a drawing illustrating a first variation of the input device according to the embodiment.

FIG. 5 is a drawing illustrating a first variation of the input device 10 of the present embodiment. An input device 10A illustrated in FIG. 5 differs from the input device 10 described with reference to FIGS. 1 through 4B in that the elastic part 150 is replaced with a leaf spring 142 that is formed of a part of the metal frame 140. The leaf spring 142 is a component shaped like a leaf spring and formed by bending a part of the metal frame 140 upward. An end of the leaf spring 142 is in contact with an end of the protruding part 131C of the lever 131, and the protruding part 131C is pressed upward with a moderate pressing force applied by the leaf spring 142.

With the configuration of the first variation, the leaf spring 142 can close a gap between the end face of the protruding part 131C and the metal frame 140, and can apply a pre-pressure to the protruding part 131C at such a level that the deformation part 131A does not deform. Also, with the configuration of the first variation, the leaf spring 142 can absorb vibration between the operation panel 110 and the metal frame 140. Further, with the configuration of the first variation, the leaf spring 142 can prevent vibration of the actuators 120 from being transferred to the metal frame 140.

The operation of the force sensor unit 130 illustrated in FIG. 5 is substantially the same as the operation of the force sensor unit 130 illustrated in FIG. 4. That is, in the force sensor unit 130 illustrated in FIG. 5, when the operation panel 110 is pressed downward, the entire operation panel 110 moves downward, the protruding part 131C is pressed upward by the leaf spring 142, and the deformation part 131A warps upward. As a result, the pressure detection element 132 provided on the upper (+Z side) surface of the deformation part 131A warps and outputs a voltage signal indicating a voltage value corresponding to the warp as a pressure detection signal indicating a pressing force applied to the operation surface of the operation panel 110.

Second Variation

Figure 6:
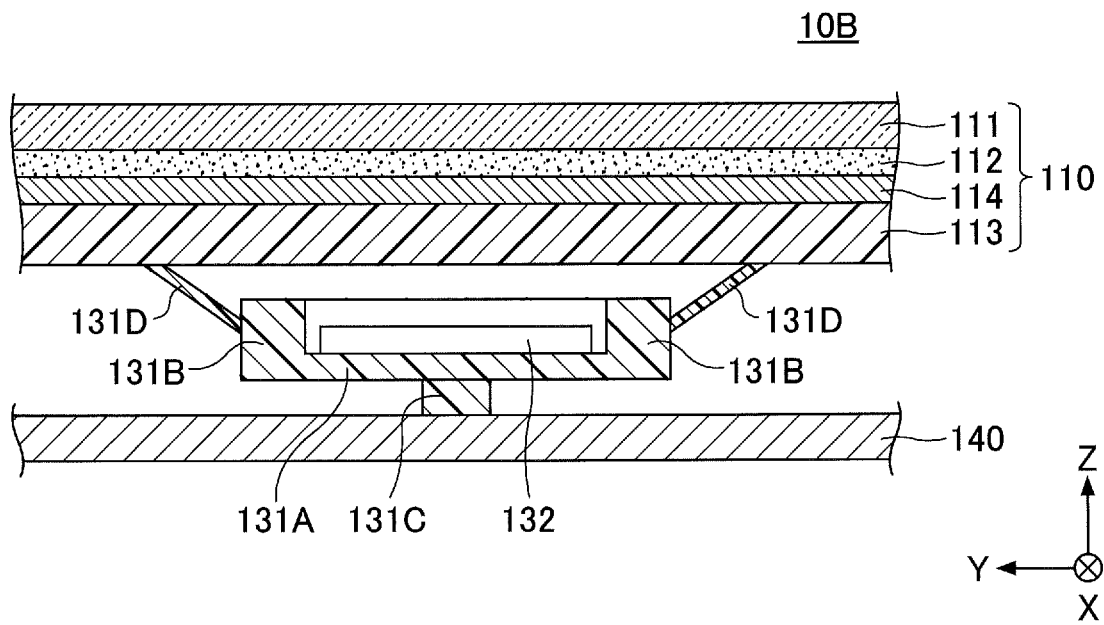
FIG. 6 is a drawing illustrating a second variation of the input device according to the embodiment.

FIG. 6 is a drawing illustrating a second variation of the input device 10 according to the present embodiment. An input device 10B illustrated in FIG. 6 differs from the input device 10 described with reference to FIGS. 1 through 4B in that the elastic part 150 is replaced with an elastic part 131D formed on a side surface of the lever 131. The elastic part 131D is a component shaped like a leaf spring or a thin plate and extends upward and outward from the side surface of the lever 131 (the surrounding wall 131B). An end of the elastic part 131D is connected to the lower (−Z side) surface of the printed board 113. The elastic part 131D distances the lever 131 from the printed board 113 and supports the lever 131 together with the printed board 113. The lever 131 is biased downward by the elastic force of the elastic part 131D. With this configuration, the end face of the protruding part 131C of the lever 131 contacts the upper (+Z side) surface of the metal frame 140, and a moderate pre-pressure is applied by the metal frame 140 to the protruding part 131C. The elastic part 131D may be formed to extend continuously along the entire periphery of the lever 131, or may be comprised of multiple parts (e.g., one for each side of the lever 131) that are arranged at regular intervals along the periphery of the lever 131.

With the configuration of the second variation, the elastic force of the elastic part 131D can close the gap between the end face of the protruding part 131C and the metal frame 140, and can apply a pre-pressure to the protruding part 131C at such a level that the deformation part 131A does not deform. Also, with the configuration of the second variation, vibration between the operation panel 110 and the metal frame 140 can be absorbed by the elastic part 131D. Further, with the configuration of the second variation, the elastic part 131D can prevent vibration of the actuators 120 from being transferred to the metal frame 140.

The operation of the force sensor unit 130 illustrated in FIG. 6 is substantially the same as the operation of the force sensor unit 130 illustrated in FIG. 4. That is, in the force sensor unit 130 illustrated in FIG. 6, when the operation panel 110 is pressed downward, the entire operation panel 110 moves downward, the protruding part 131C is pressed upward by the metal frame 140, and the deformation part 131A warps upward. As a result, the pressure detection element 132 provided on the upper (+Z side) surface of the deformation part 131A warps and outputs a voltage signal indicating a voltage value corresponding to the warp as a pressure detection signal indicating a pressing force applied to the operation surface of the operation panel 110.

Third Variation

Figure 7:
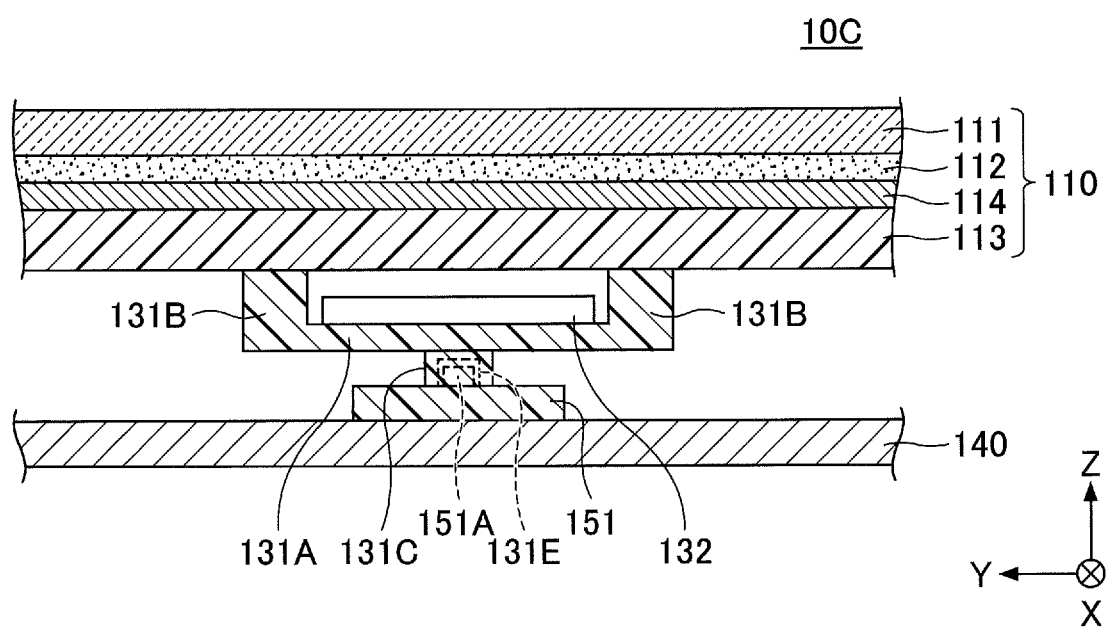
FIG. 7 is a drawing illustrating a third variation of the input device according to the embodiment.

FIG. 7 is a drawing illustrating a third variation of the input device 10 according to the present embodiment. An input device 100 illustrated in FIG. 7 differs from the input device 10 described with reference to FIGS. 1 through 4B in that the elastic part 150 is replaced with an elastic part 151 and a recess 131E is formed in the lower (−Z side) surface of the protruding part 131C. The elastic part 151 is different from the elastic part 150 in that a protrusion 151A is provided on the upper (+Z side) surface of the elastic part 151. In a state where the elastic part 151 is sandwiched between the protruding part 131C and the metal frame 140, the protrusion 151A engages with (or is fitted in) the recess 131E of the protruding part 131C to set the position of the elastic part 151 in the horizontal direction (the X-axis direction and the Y-axis direction in the drawing). Thus, with the configuration of the third variation, the position of the elastic part 151 can be fixed without bonding the elastic part 151 to the metal frame 140. For example, the configuration of the third variation makes it possible to reduce the work load of assembling the input device 10.

Fourth Variation

Figure 8:
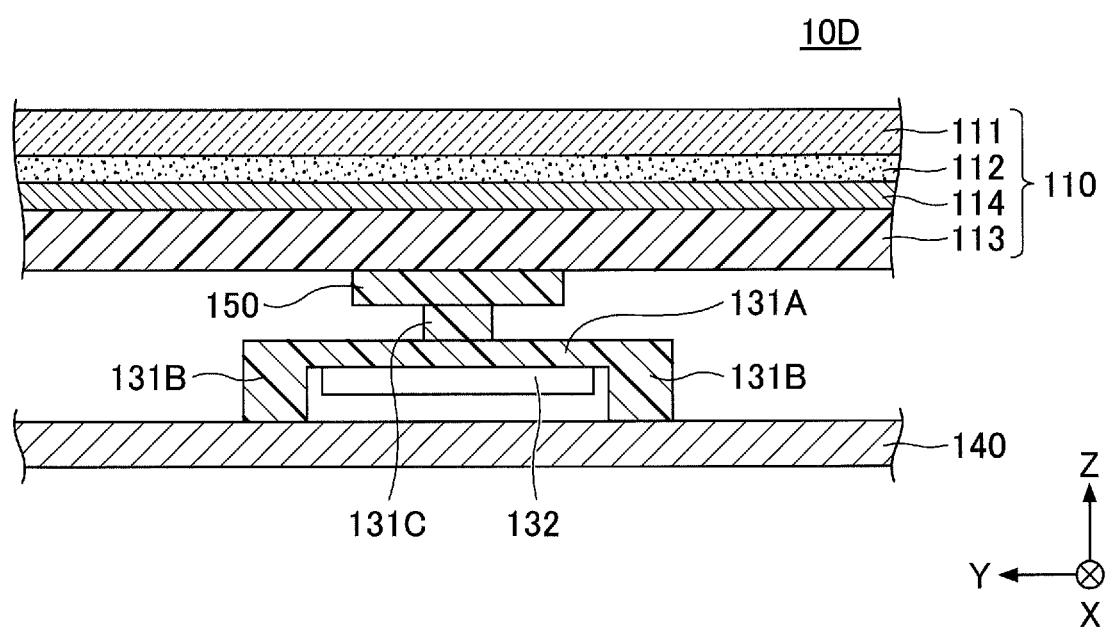
FIG. 8 is a drawing illustrating a fourth variation of the input device according to the embodiment.

FIG. 8 is a drawing illustrating a fourth variation of the input device 10 according to the present embodiment. An input device 10D illustrated in FIG. 8 differs from the input device 10 described with reference to FIGS. 1 through 4B in that the force sensor unit 130 is turned upside down. That is, in the input device 10D illustrated in FIG. 8, the lower (−Z side) surface of the surrounding wall 131B of the lever 131 is bonded to the upper (+Z side) surface of the metal frame 140. Also, the protruding part 131C protrudes upward toward the printed board 113 from the central portion of the upper (+Z side) surface of the deformation part 131A. The elastic part 150 is disposed between the end face of the protruding part 131C and the printed board 113. Also, the pressure detection element 132 is provided on the lower (−Z side) surface of the deformation part 131A.

The operation of the force sensor unit 130 illustrated in FIG. 8 is substantially the same as the operation of the force sensor unit 130 illustrated in FIGS. 4A and 4B except that the operation in the vertical direction is inverted. That is, in the force sensor unit 130 illustrated in FIG. 8, when the operation panel 110 is pressed downward, the entire operation panel 110 moves downward, the protruding part 131C is pressed downward by the printed board 113, and the deformation part 131A warps downward. As a result, the pressure detection element 132 provided on the lower (−Z side) surface of the deformation part 131A warps and outputs a voltage signal indicating a voltage value corresponding to the warp as a pressure detection signal indicating a pressing force applied to the operation surface of the operation panel 110.

Input devices according to the embodiment of the present invention are described above. However, the present invention is not limited to the specifically disclosed embodiment, and variations and modifications may be made without departing from the scope of the present invention.

For example, in the input device 10 of the above embodiment, one pressure detection element 132 is provided on the surface of the deformation part 131A. However, the present invention is not limited to this example, and two or more pressure detection elements 132 may be provided on the surface of the deformation part 131A.

Also, for example, in the input device 10 of the above embodiment, the elastic part 150 is provided between the end face of the protruding part 131C of the lever 131 and the metal frame 140. However, the present invention is not limited to this example, and the elastic part 150 may be provided between the end face of the surrounding wall 131B of the lever 131 and the printed board 113.

Also, for example, in the input device 10 of the above embodiment, the protruding part 131C is provided as a part of the lever 131 and disposed between the lever 131 and the metal frame 140. However, a similar protruding part may be provided on the metal frame 140.

Also, for example, the input device 10 of the above embodiment does not include a display panel (that is, the input device 10 is a touch pad). However, the present invention is not limited to this example, and the input device 10 may include a display panel (e.g., between the operation panel 110 and the metal frame 140) (i.e., may be implemented as a touch panel).

Further, for example, in the input device 10 of the above embodiment, the elastic part 150 is provided between the end face of the protruding part 131C of the lever 131 and the metal frame 140. However, the present invention is not limited to this example, and the elastic part 150 may be omitted so that the end face of the protruding part 131C directly contacts the metal frame 140.

An aspect of this disclosure makes it possible to provide an input device that has a relatively simple configuration and can still accurately detect a pressing force applied to an operation panel regardless of a pressed position on the operation panel.

What is claimed is:

1. An input device, comprising:
   an operation panel including an operation surface;
   a frame disposed on a back side of the operation panel;
   a force sensor unit that is disposed between the operation panel and the frame to detect a pressing force applied to the operation surface and includes
      a lever including a deformation part that warps when the pressing force is applied, a protruding part that is provided on a first surface of the deformation part and protrudes toward the frame or the operation panel, and a surrounding wall provided on a periphery of a second surface of the deformation part, the deformation part being configured to warp when the pressing force is applied via the protruding part to the deformation part, and
      a pressure detection element that is disposed in a region of the second surface of the deformation part surrounded by the surrounding wall, warps along with the deformation part, and outputs a pressure detection signal corresponding to the pressing force; and
   an elastic part that is disposed between the protruding part and the frame or the operation panel and applies a pre-pressure to the deformation part.

2. The input device as claimed in claim 1, wherein a rigidity of the deformation part against the pressing force is lower than a rigidity of the operation panel against the pressing force.

3. The input device as claimed in claim 1, further comprising:
   multiple cushioning parts that are disposed between the operation panel and the frame and support the operation panel such that the operation panel is movable in a vertical direction relative to the frame,
   wherein at least a part of the force sensor unit is disposed in a region surrounded by the multiple cushioning parts.

4. The input device as claimed in claim 3, wherein the force sensor unit is disposed substantially in a center of the region surrounded by the multiple cushioning parts.

5. The input device as claimed in claim 1, wherein the elastic part is a sheet-shaped part and includes a protrusion that engages with a recess formed on the protruding part.

6. The input device as claimed in claim 1, wherein the elastic part is a component shaped like a leaf spring and formed by bending a part of the frame.

7. An input device, comprising:
   an operation panel including an operation surface;
   a frame disposed on a back side of the operation panel;
   a force sensor unit that is disposed between the operation panel and the frame to detect a pressing force applied to the operation surface and includes
      a lever including a deformation part that warps when the pressing force is applied, a protruding part that is provided on a first surface of the deformation part and protrudes toward the frame or the operation panel, and a surrounding wall provided on a periphery of a second surface of the deformation part, the deformation part being configured to warp when the pressing force is applied via the protruding part to the deformation part, and a pressure detection element that is disposed in a region of the second surface of the deformation part surrounded by the surrounding wall, warps along with the deformation part, and outputs a pressure detection signal corresponding to the pressing force; and an elastic part that is disposed between the surrounding wall and the operation panel and applies a pre-pressure to the deformation part.

8. The input device as claimed in claim 7, wherein a rigidity of the deformation part against the pressing force is lower than a rigidity of the operation panel against the pressing force.

9. The input device as claimed in claim 7, further comprising:

multiple cushioning parts that are disposed between the operation panel and the frame and support the operation panel such that the operation panel is movable in a vertical direction relative to the frame, wherein at least a part of the force sensor unit is disposed in a region surrounded by the multiple cushioning parts.

10. The input device as claimed in claim 9, wherein the force sensor unit is disposed substantially in a center of the region surrounded by the multiple cushioning parts.

11. The input device as claimed in claim 7, wherein the elastic part is a component shaped like a leaf spring and extends outward from a side surface of the lever.

* * * * *